(No Model.)
R. L. STEVENS.
COMBINED TELESCOPE, MICROSCOPE, AND CAMERA.
No. 545,743. Patented Sept. 3, 1895.
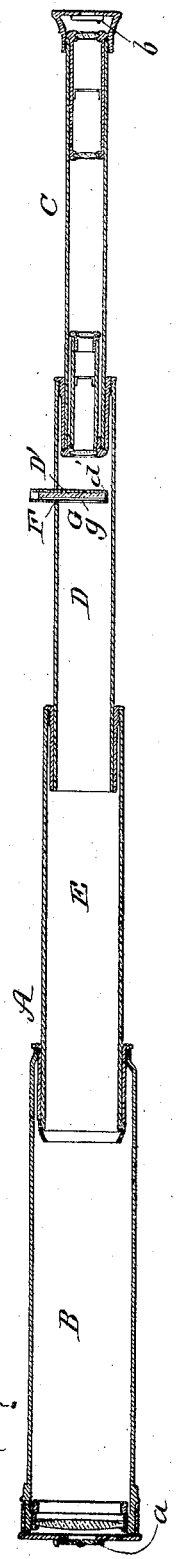
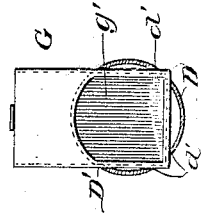
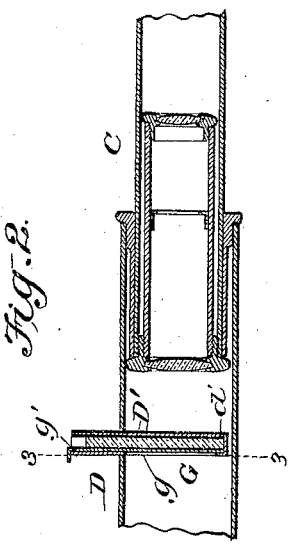
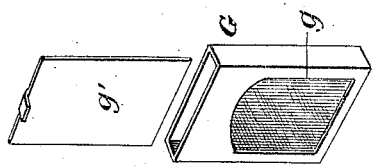
WITNESSES:
Jos. A. Ryan
Amos W. Hart
INVENTOR
Robert L. Stevens.
BY Munn & Co.
ATTORNEYS.

UNITED STATES PATENT OFFICE.

ROBERT L. STEVENS, OF VINELAND, NEW JERSEY.

COMBINED TELESCOPE, MICROSCOPE, AND CAMERA.

SPECIFICATION forming part of Letters Patent No. 545,743, dated September 3, 1895.

Application filed October 30, 1894. Serial No. 527,430. (No model.)

*To all whom it may concern:*

Be it known that I, ROBERT L. STEVENS, residing at Vineland, in the county of Cumberland and State of New Jersey, have invented a new and Improved Combined Telescope, Microscope, and Camera, of which the following is a specification.

My invention relates to certain improvements in the ordinary telescope, which will render such instrument capable of use as an ordinary telescope, a microscope, and as a photographic camera, the detailed construction of such improvements being specially arranged to adapt the instrument for use as a photographic camera.

The main object of my invention is to provide a telescope so constructed and arranged for connection with certain attachable parts that it can be adjusted for use as a photographic camera in which the sensitized plates or films can be connected therewith without necessitating the use of a dark-room or a ground or focusing glass. It has for its object, furthermore, to provide certain attachments for an ordinary telescope which can be readily attached and detached and which when in use can be quickly manipulated and which will effectively serve for their intended purposes.

In the accompanying drawings, Figure 1 is a longitudinal section of an ordinary telescope equipped with my improved attachments. Fig. 2 is a similar view of a portion thereof on a somewhat enlarged scale. Fig. 3 is a cross-section of the same, taken on the line 3 3, Fig. 2. Fig. 4 is a detail view illustrating one form of slide or plate holder.

A indicates an ordinary telescope, which has the usual object-glass end piece B, the eye or microscopic end section C, and the intermediate or object-focusing sections D and E. At the point at which the fixed focal point of the microscopic section C appears when the said section C is drawn out to its fullest extent the section D is slitted, as shown at D', and provided with apertures $d'$ $d'$ opposite the slit D', as most clearly shown in Fig. 3. At this point it should be stated that from practical experimenting I have found by first extending the telescope to its full length and then manipulating the sections B and E so as to bring the object into a sharp focus and inserting a plate in the slit the picture or object sighted will appear sharp and distinct upon such plate at the focal point F, and as every telescope having a microscopic end piece has a fixed focal point when such end piece is drawn out it follows that the picture or object can be sighted and brought into a proper focus at the point F without the use of the ground glass usually employed for sighting photo objects. Hence after thus focusing, should a sensitized plate be inserted in the slit the picture will be taken thereon sharp and true, the same as in an ordinary camera.

To avoid the use of a dark-chamber, I prefer to use slides constructed as shown in Fig. 4, in which G indicates a casing having an opening $g$ at one side, which is adapted to be held closed by a slide-plate $g'$. So far as described it will be readily apparent that after the section C is drawn out to its full extent and the object-glass adjusted to bring the view into a proper focus the cap or slides $a$ $b$ at the object or eye ends are closed. The plate-holder G is then inserted in the slot D with its opening facing the object-glass. Its slide is then withdrawn, after which the cap or slide over the object end is momentarily removed and returned. The slide in the plate-holder is then returned and the plate-holder removed, the plate being afterward developed and fixed in the usual manner.

From the foregoing description, taken in connection with the drawings, it is thought the novel advantages of my invention will readily appear. It will be seen by their use that I provide a single instrument capable of use as a telescope, microscope, or camera.

Having thus described my invention, what I claim, and desire to secure by Letters Patent, is—

1. The improved instrument, comprising the telescopic sections, the outer one having an object glass, the inner one having the eye piece, and one of the intermediate ones having a pocket or slit for receiving a plate-holder when the inner or eye section is extended, said pocket or slit being arranged to receive a sensitized plate holder all arranged substantially as shown and for the purposes described.

2. A combined telescope and camera comprising an extensible body portion having an object glass at one end, a telescope connection therewith having an eye or microscope end piece, an intermediate section having a fixed focal point, and having its body portion provided with a plate receiving pocket or slit in line with such fixed focal point, substantially as shown and for the purposes described.

ROBERT L. STEVENS.

Witnesses:
ISAAC E. JOHNSON,
IDA J. BAKER.